June 26, 1973   E. M. WAGNER   3,741,816
THERMOCOUPLE STRUCTURES
Filed Oct. 21, 1970   2 Sheets-Sheet 1
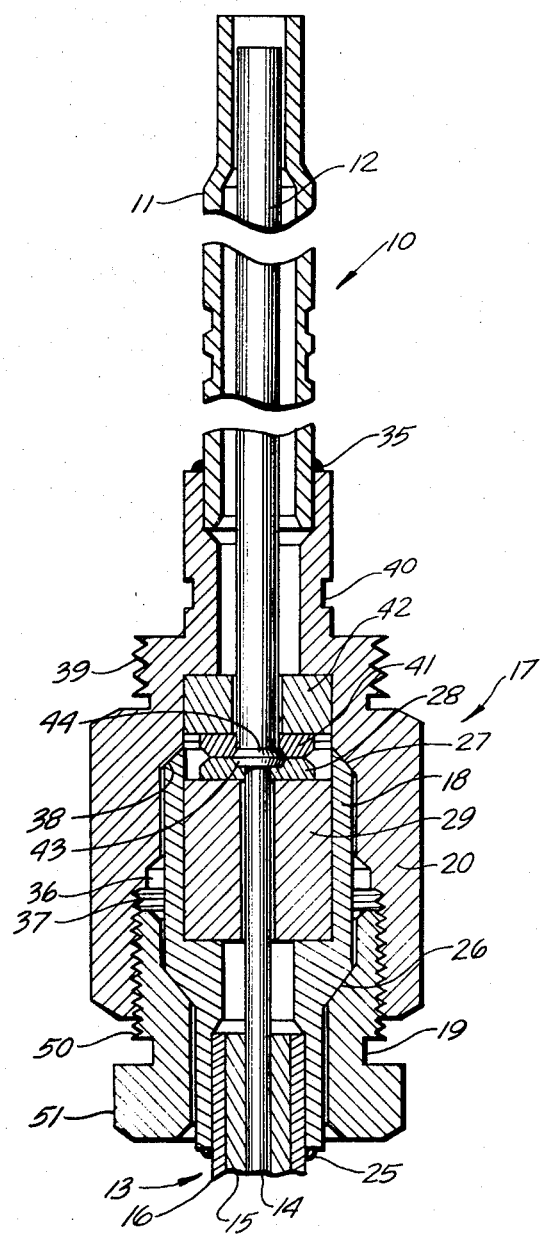
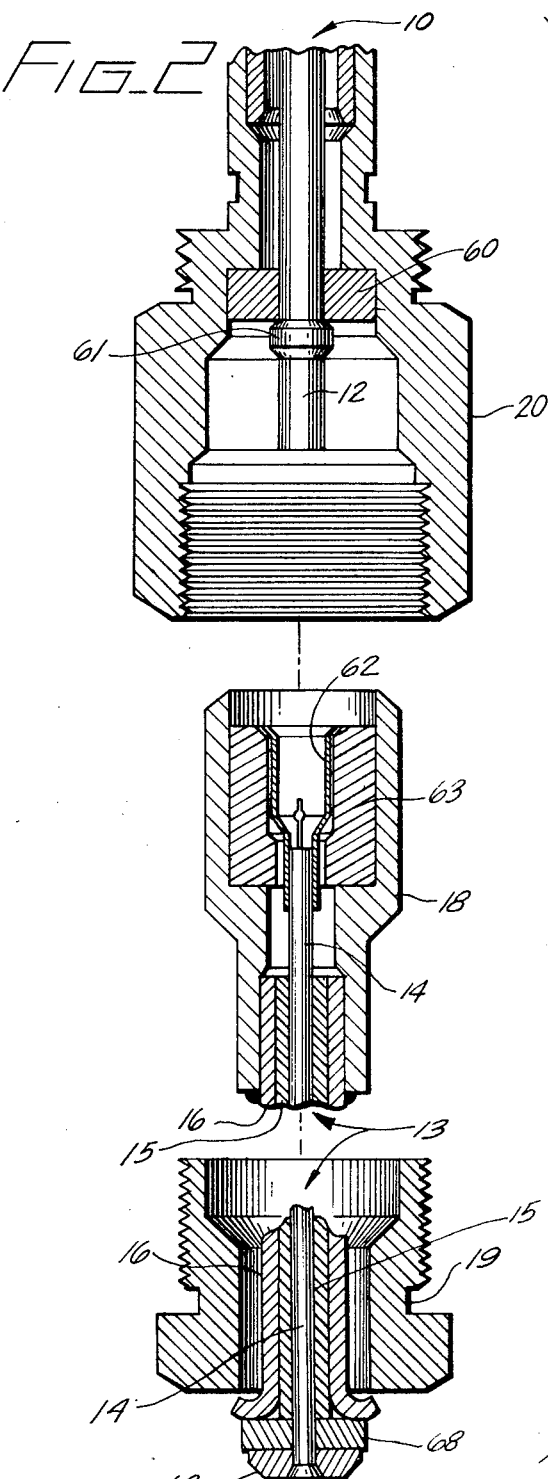
INVENTOR.
EDMOND M. WAGNER
BY
Christie, Parker & Hale
ATTORNEYS

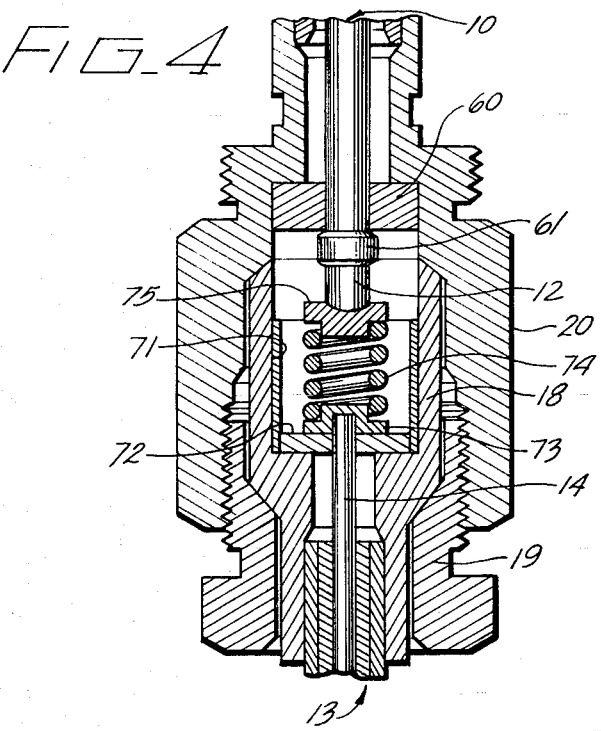
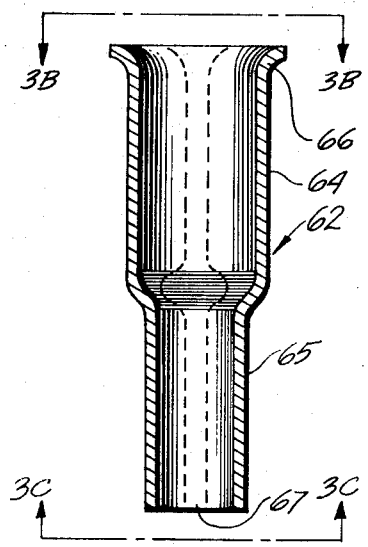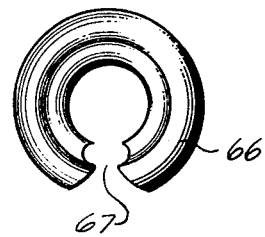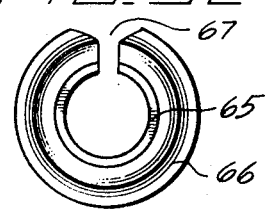

United States Patent Office 3,741,816
Patented June 26, 1973

3,741,816
THERMOCOUPLE STRUCTURES
Edmond M. Wagner, Sierra Madre, Calif., assignor to Jade Controls, Inc., Montclair, Calif.
Continuation-in-part of application Ser. No. 734,512, June 3, 1968, now Patent No. 3,556,864, dated Jan. 19, 1971. This application Oct. 21, 1970, Ser. No. 82,762
Int. Cl. H01v 1/06
U.S. Cl. 136—228
13 Claims

ABSTRACT OF THE DISCLOSURE

A thermocouple is joined to a coaxial lead cable by a separable connector. The cold thermocouple junctions are formed at the connector, which comprises a sleeve, a nut having male threads, and a fitting having a cavity with mating female threads. The fitting is attached to the thermocouple tube so the thermocouple inner wire extends into the cavity, and the sleeve is attached to the outer conductor of the lead cable, so the inner conductor of the lead cable extends through the sleeve. The nut fits around the base of the sleeve. As the nut is screwed into the fitting, it forces the end of the sleeve to seat on a shoulder formed in the cavity of the fitting, thereby sealing the interior of the tube and the cable at their junction from the atmosphere. The electrical connection between the thermocouple inner wire and the inner conductor of the lead cable has limited longitudinal freedom of movement to accommodate for variations in the sleeve seating required to form the seal.

CROSS-REFERENCE TO RELATED APPLICATIONS

This application is a continuation-in-part of a copending, commonly owned Pat. 3,556,864, issued on Jan. 19, 1971, the disclosure of which is incorporated herein by reference.

BACKGROUND OF THE INVENTION

This invention relates to thermocouples and, more particularly, to thermocouple structures especially suited for use in the pilot burner of a gas heater.

Conventionally, the thermocouple used is a target type pilot burner, of which the pilot burner disclosed in U.S. Pat. 3,291,185, issued to Harold A. MacIntosh et al., is typical, comprises a length of wire and a length of tube made from dissimilar metals. The length of wire, which has an appreciably smaller diameter than the inside diameter of the tube, lies inside the tube in axial alignment therewith. A hot thermocouple junction is formed between the tube and the wire in the vicinity of one end of the tube. At the other end, the tube and wire are electrically and mechanically joined, respectively, to the inner and outer conductors of a coaxial lead cable. It is very advantageous to form a seal at the junction of the tube and the outer conductor of the coaxial cable to reduce the exposure of the interior of the thermocouple to the atmosphere. Exposure to the atmosphere reduces the potential life of the thermocouple, due to oxidation of the wire. The joint between the outer conductor of the coaxial cable and the tube is conventionally made by soldering or brazing, thereby ensuring both a strong sealed mechanical connection and a good electrical connection. For example, Pat. 3,022,361, which issued to Robert W. Fritts et al., discloses a thermocouple that is sealed in this way and has a separable electrical connector at the other end of the lead cable to connect the thermocouple to an external circuit.

When such a thermocouple becomes defective, both the thermocouple and the coaxial lead cable must be replaced because they are permanently joined into an integral unit. The addition of the coaxial lead cable contributes substantially to the replacement cost of the unit. Further, the length of coaxial lead cable makes the thermocouple unit more difficult to handle, install, and replace. For example, in a number of applications, a pilot burner is located in a hard to reach, relatively inaccessible place, and has a threaded thermocouple mount, so the entire unit, including the cable, turns as the thermocouple is being installed.

SUMMARY OF THE INVENTION

The invention contemplates a thermocouple and a lead cable joined by a separable connector having a male member and a female member adapted to mate with each other and to complete two mutually insulated electrical paths. One member of the connector is electrically connected respectively to the ends of the thermocouple tube and wire opposite the hot thermocouple junction. The other member of the connector is electrically connected respectively to the leads of the cable. The electrical path between at least one lead and one of the elements of the thermocouple includes dissimilar metals so as to form a cold thermocouple junction. To replace the thermocouple, the male and female members are separated and the connector member of a new thermocouple is mated with the connector member of the cable after the thermocouple is placed in the thermocouple mounting bracket. Therefore, the cable does not have to be replaced or turned with the thermocouple, as a new thermocouple is screwed into a threaded mount.

Most advantageously, the connector is configured to seal the interior of the thermocouple tube from the atmosphere as the male and female members are mated. Specifically, a sleeve is electrically joined and mechanically sealed to the outer conductor of a coaxial lead cable. A nut with male threads surrounds the base of the sleeve. The nut could be integral with its sleeve if desired. A fitting having a cavity with female threads that mate with the male threads of the nut is electrically joined and mechanically sealed to the thermocouple tube. The sleeve, nut, and fitting are all electrically conductive. When the nut is screwed into the fitting, it forces the end of the sleeve to seat on a shoulder formed in the cavity of the fitting, thereby sealing the interior of the thermocouple tube and the cable from the atmosphere at their junction. Thus, oxidation of the thermocouple wire is substantially reduced.

An important feature of the invention is the provision of an electrical connection with limited longitudinal freedom of movement between the inner conductor of the coaxial lead cable and the thermocouple wire, to accommodate for variations in the sleeve seating required to form the seal at the junction of the thermocouple and the cable. Accordingly, a mechanical seal and a good electrical connection are both insured at the separable connector. An insulator mounted in the cavity of the fitting controls the position of the end of the thermocouple wire, an insulator mounted in the sleeve controls the position of the end of the cable inner conductor, and the restoration force of a deformed spring maintains either direct or indirect electrical contact between the ends of the thermocouple wire and the cable inner conductor when the connector is mated.

BRIEF DESCRIPTION OF THE DRAWINGS

The features of specific embodiments of the best mode contemplated of carrying out the invention are illustrated in the drawings, in which:

FIG. 1 is a side elevation view in section of a thermocouple, a lead cable, and a connector incorporating the principles of the invention;

FIG. 2 is a side elevation view in section of an alternative embodiment of the invention;

FIGS. 3A, 3B, and 3C are a side elevation, top plan, and bottom plan views, respectively, of the spring clip employed in the embodiment of FIG. 2; and FIG. 4 is a side elevation view in section of another alternative embodiment of the invention.

DETAILED DESCRIPTION OF THE DRAWINGS

The disclosure of Patent 3,556,864 is incorporated herein by reference. That patent discloses between a thermocouple and a lead cable a separable connector that has an inner connection with limited longitudinal freedom of movement but without a seal from the atmosphere.

In FIG. 1, a thermocouple 10 comprises a length of tube 11 made of one metal, such as stainless steel, and a length of wire 12 made of a dissimilar metal, such as copel. Wire 12 lies inside of tube 11 in approximate axial alignment therewith. A hot thermocouple junction, not represented in FIG. 1, is formed by some means between tube 11 and wire 12 in the vicinity of their extremities. Preferably, the hot thermocouple junction is formed by one of the methods disclosed in Patent 3,556,864. A coaxial lead cable 13 comprises an inner conductor 14 that is surrounded by insulation 15 and an outer conductor 16, both of which could be made of copper. Inner conductor 14 and its insulation 15 is free to move axially relative to outer conductor 16 by kinking inside of outer conductor 16.

Thermocouple 11 and coaxial cable 13 are electrically joined by a separable connector 17 comprising three separable parts, a sleeve 18, a nut 19 and a fittting 20, all of which are made from an electrically conductive permanently deformable material, such as brass. Sleeve 18 is mechanically sealed and electrically connected to outer conductor 16 by an annular brazed joint 25. Sleeve 18 has an annular tapered conical base 26 and an annular tapered conical end 27 that play a role in the formation of a seal at connector 17, as described in detail below. Inner conductor 14 extends through sleeve 18 to a point adjacent to end 27. A disc 28 of electrically conductive material such as brass is fixed to the end of inner conductor 14 by a button 44 of solder. An annular resilient, heat-resistant insulator 29 fills the remainder of the space within sleeve 18. Insulator 29 could be made of a highly resilient, fiber-reinforced plastic or other rubber-like material that will not take a set when exposed to temperatures in the order of 600° to 700° F. Insulator 29 serves to center inner conductor 14 axially within sleeve 18, to insulate inner conductor 14 electrically from sleeve 18 to provide limited longitudinal freedom of movement for disc 28, and to keep the end of inner conductor 14 from slipping back away from end 27 on sleeve 18. Insulator 29 fits loosely enough to permit inner conductor 14 to move axially relative thereto.

Fitting 20 is mechanically sealed and electrically connected to tube 11 by an annular brazed joint 35. Fitting 20 includes a cavity 36 having a surface 37 with female threads and a shoulder 38 with a tapered surface that matches the taper of end 27 on sleeve 18. Surface 37 and shoulder 38 also play a role in the formation of the seal in connector 17, as described in detail below. A surface 39 has male threads for mounting a thermocouple on a conventional bracket and an annular indentation for a clip mount is formed in a surface 40. The male threads can be formed directly on surface 39 of the thermocouple unit rather than on a separate clip supported adapter because the thermocouple unit and the coaxial cable are separate entities capable of rotating with respect to each other during installation or replacement. Wire 12 extends through fitting 20 to a point adjacent to shoulder 38. A disc 41 of electrically conductive material such as brass is fixed to the end of wire 12 by a button 43 of solder. An insulator 42 fills the space in fitting 20 around the end of wire 12. Insulator 42 serves to center wire 12 axially within fitting 20, to insulate wire 12 electrically from fitting 20, and to prevent the end of wire 12 from slipping back away from shoulder 38. Insulator 42 fits loosely enough to permit wire 12 to move longitudinally in a limited way relative thereto by bending. Although it is preferable that only insulator 29 be resilient, insulator 42 could also be resilient if more longitudinal freedom of movement is needed. The electrical contact between wire 12 and inner conductor 14 is actually made by discs 41 and 28 attached respectively to the ends of wire 12 and inner conductor 14.

Nut 19 has a surface 50 with male threads that mate with the threads of surface 37, and a knurled surface 51 that serves as a hand grip.

To assemble the parts of connector 17 thereby forming a mechanical seal and an electrical connection contact between thermocouple 10 and cable 13, nut 19 is screwed into fitting 20. As nut 19 moves axially into cavity 36, it presses against base 26 of sleeve 18 so as to force end 27 on sleeve 18 against shoulder 38 on fitting 20. As end 27 seats on shoulder 38, the contacting surfaces thereof form a seal that prevents exposure of the interior of tube 11 to the atmosphere through the parts of connector 17. The mechanical seal could be established by a precisely machined match between tapered shoulder 38 and end 27 or by permanently deforming one or both of these surfaces if the taper is roughly machined. Due to the resiliency of insulator 29 and the longitudinal mobility of inner conductor 14, the electrical connection between wire 12 and inner conductor 14 has limited longitudinal freedom of movement which accommodates for variations in the seating of end 27 on shoulder 38. As sleeve 18 is pushed further into cavity 36 to form the seal after discs 41 and 28 initially contact each other, insulator 29 compresses and inner conductor 14 moves slightly in an axial direction away from connector 17. While this takes place, however, discs 41 and 28 remain in intimate contact with each other because the restoring force of insulator 29 urges them together. Connector 17 provides two mutually insulated electrical paths between thermocouple 10 and cable 13. The first path is from wire 12 to inner conductor 14 through discs 41 and 28. The second path is from tube 11 to outer conductor 16 through fitting 20, nut 19, and sleeve 18. Since each of these electrical paths includes dissimilar metals, there are two cold thermocouple junctions formed at connector 17. When thermocouple 10 is to be replaced, nut 19 is simply unscrewed from fitting 20, thermocouple 10 is removed from its mounting bracket, a new thermocouple is placed in the thermocouple mounting bracket, and then fitting 20 is screwed into the fitting of the new thermocouple to establish the mechanical seal and electrical connection in a single operation.

In FIG. 2 is shown another embodiment of an electrical connection between wire 12 and inner conductor 14 with limited longitudinal freedom of movement. The elements of FIG. 2 that are identical to FIG. 1 bear the same reference numerals. The parts of connector 17 are illustrated in their disassembled form. An insulator 60, which occupies the space between wire 12 and fitting 20, performs the same functions as insulator 42 in FIG. 1, although it is set back further from the end of wire 12. An annular protuberance 61 formed on the surface of wire 12 retains insulator 60 in the position shown. An electrically conductive spring clip 62 has a small diameter portion that grips the end of inner conductor 14 and a large diameter portion that grips the end of wire 12. The small diameter portion of spring clip 62 is spot welded to conductor 14 before conductor 14 is inserted in outer conductor 16. After the spot weld is made and insulator 63 is in place, the other end of conductor 14 is inserted in the end of conductor 16 with sleeve 18 already fixed to conductor 16 and pushed through to the other end of conductor 16 to produce the part shown in FIG. 2. Thus, each of the three separate parts shown in FIG. 2 is a self-contained unit, i.e., cannot come apart during assembly. Spring clip 62 could be made from a resilient nickel that is plated with a thin, e.g., 0.002 inch, layer of gold to provide a highly electrically conductive path between wire 12 and inner conductor 14. An electrical insulator 63 that occupies the space between spring clip 62 and sleeve 18 performs the same insulating and positioning functions as insulator 29 in FIG. 1 but need not be resilient for the construction of FIG. 2. Spring clip 62 has a flared end that retains insulator 63 in the position shown. As shown in FIG. 2, the other end of outer conductor 16 is flared. An insulator 68 separates the flared end from an electrical contact button 69, which is soldered to inner conductor 14 after it is inserted through outer conductor 16.

Reference is made to FIGS. 3A, 3B, and 3C for a detailed description of spring clip 62. Spring clip 62 has a large diameter portion 64 with a diameter slightly smaller than the diameter of wire 12, and a small diameter portion 65 with a diameter slightly smaller than inner conductor 14. At one end portion 64 is terminated in an annular flare 66, which as mentioned in the preceding paragraph retains insulator 63 and also serves to guide wire 10 into hole 64. The circumferential continuity of spring clip 62 is broken by a longitudinal slot 67, which extends along the entire length of spring clip 62. Slot 67 permits portions 64 and 65 to expand circumferentially when wire 12 is inserted in portion 64 and inner conductor 14 is inserted in portion 65, causing spring clip 62 to grip wire 12 and conductor 14.

When the parts of connector 17 in FIG. 2 are assembled, wire 12 and inner conductor 14 lie inside spring clip 62, which is deformed thereby to establish a force fit with wire 12 and conductor 14. As a result, spring clip 62 is in intimate contact with wire 12 and inner conductor 14, thereby providing a good electrical connection therebetween. This electrical connection has limited longitudinal freedom of movement because spring clip 62 maintains a force fit with wire 12 as long as the end of wire 12 extends into portion 64, irrespective of the extent of penetration.

In FIG. 4 is shown another embodiment of an electrical connection between wire 12 and inner conductor 14 with limited longitudinal freedom of movement. The elements of FIG. 4 that are identical to FIG. 2 bear the same reference numerals. In this embodiment, the end of wire 12 is slightly shorter. A cylindrical insulator 71 covers the side surface of sleeve 18 and a circular insulator 72 covers the inner end of the cavity in sleeve 18. Inner conductor 14 extends through insulator 72 to the interior of sleeve 18 where an electrically conductive spring keeper 73 is fixed to its end. An electrically conductive spring keeper 75 has an indentation on its upper surface that matches the curve on the end of the wire 12, as shown in FIG. 4. When the parts of connector 17 in this embodiment are assembled, an electrically conductive coil spring 74 is fixed on keepers 73 and 75 by force fits or spot welds and is retained between spring keepers 73 and 75. Spring keeper 75 is held in engagement with wire 12 by the restoring force of spring 74. Spring 74 could be fabricated from stainless steel and plated with a thin copper layer, e.g. 0.003 to 0.008 inch for greater electrical conductivity. Thus, an electrical connection having limited longitudinal freedom of movement is established between wire 12 and inner conductor 14 through spring keeper 75, spring 74, and spring keeper 73. When assembled, as shown in FIG. 4, intimate contact is always maintained between spring 74 and spring keepers 73 and 75, irrespective of variations in the seating of the end of sleeve 18 on the shoulder of fitting 20 because spring 73 is compressed. To assemble the parts of connector 17 in this embodiment, spring 73 would first be placed on one of the spring keepers and held in an upright position, i.e., with its axis vertical, while the parts are assembled.

It can be seen that in each of the embodiments of the invention there is formed an electrical connection between wire 12 and inner conductor 14 that has limited longitudinal freedom of movement to accommodate for variations in the sleeve seating required to form a seal at the junction between thermocouple 10 and lead cable 13. In each case, an insulator mounted in the cavity of fitting 20 controls the position of the end of wire 12, an insulator mounted inside sleeve 18 controls the position of the end of inner conductor 14, and the restoration force of a deformed spring maintains either direct or indirect electrical contact between the ends of wire 12 and inner conductor 14 when connector 17 is assembled. In the embodiment of FIG. 1, the spring comprises insulator 29; in the embodiment of FIG. 2, the spring comprises spring clip 62; in the embodiment of FIG. 4, the spring comprises coil spring 74.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, sleeve 18 and nut 19 could be integral with each other rather than separate parts, although in such case cable 13 would rotate as nut 19 is screwed. Further, many other arrangements could be devised to form an electrical connection having limited longitudinal freedom of movement between the inner thermocouple wire and the inner conductor of the lead cable.

What is claimed is:

1. A thermocouple structure comprising:
   a length of tube made from one metal;
   a length of wire made from a dissimilar metal, the wire having an appreciably smaller diameter than the inside diameter of the tube and lying inside of the tube in approximate axial alignment therewith;
   an electrical connection between the wire and the tube in the vicinity of one end of the tube forming a hot thermocouple junction;
   inner and outer coaxial mutually insulated conductors;
   a separable connector having mating male and female members and having two mutually insulated electrical paths;
   the mating male and female members forming the one electrical path between the tube and outer conductor;
   an electrically conductive cylindrical spring clip forming the other electrical path between the wire and the inner conductor, the clip having a longitudinal slit, a first portion slightly smaller in diameter than the wire, and a second portion slightly smaller in diameter than the inner conductor, the first portion engaging the wire and the second portion engaging the inner conductor; and
   means for atmospherically sealing the mating male and female members of the connector.

2. The thermocouple structure of claim 1, in which the female member is a fitting having a cavity with female threads, the tube is mechanically sealed from the atmosphere and electrically connected to the fitting, the male member is a plug having a surface with male threads that mate with the female threads of the fitting, the outer conductor is mechanically sealed from the atmosphere and electrically connected to the plug, and the sealing means comprises a seating surface on the fitting and an end surface on the plug against which the seating surface of the fitting seats to form a seal when the male threads are mated with the female threads.

3. The thermocouple structure of claim 2, in which the plug comprises a sleeve having the end surface and being mechanically sealed from the atmosphere and electrically connected to the outer conductor and a nut having a surface with the male threads, the nut being separable from the sleeve and being free to move relative to the outer conductor, the nut surrounding the sleeve so as to press the end of the sleeve against the seating surface of the fitting when the male threads are mated with the female threads.

4. The thermocouple structure of claim 3, in which the connector additionally comprises a first insulator mounted in the cavity of the fitting between the fitting and the wire to control the position of the end of the wire and a second insulator mounted inside the sleeve between the sleeve and the inner conductor to control the position of the end of the inner conductor.

5. A thermocouple structure comprising:
a thermocouple having first and second metallic elements that are electrically isolated except for a single thermocouple junction;
a lead cable having first and second electrically isolated conductors;
a connector having an outer body portion that electrically connects the first element of the thermocouple to the first conductor of the cable, the outer body portion comprising members that are separable by relative movement along a given axis; and
means inside the outer body portion for forming between the second element of the thermocouple and the second conductor of the cable a separable internal electrical coupling with limited freedom of movement relative to the body portion along the given axis, the body portion and the internal coupling being electrically isolated from each other, the internal electrical coupling comprising an electrically conductive cylindrical spring clip with a longitudinal slit, a first portion slightly smaller in diameter than the second element, and a second portion slightly smaller in diameter than the second conductor, the first portion engaging the second element and the second portion engaging the second conductor.

6. The thermocouple structure of claim 5, in which the outer body of the connector comprises first and second engageable members and the thermocouple structure additionally comprises means for mechanically sealing from the atmosphere and electrically connecting the first element of the thermocouple to the first member, means for mechanically sealing from the atmosphere and electrically connecting the first conductor to the second member, and means for sealing from the atmosphere the first and second members when they are engaged.

7. The thermocouple structure of claim 6, in which one of the members is a fitting having a cavity with female threads and a seating surface, and the other member is a plug having male threads that mate with the female threads of the fitting when the members are engaged and an end surface capable of seating on the seating surface of the fitting to form a seal when the male threads are mated with the female threads.

8. The thermocouple structure of claim 7, in which the plug comprises a sleeve having the end surface, the sleeve being mechanically sealed and electrically connected to the first conductor, and a nut separable from the sleeve and free to move relative to the cable, the nut having the male threads and surrounding the sleeve to press the end of the sleeve against the sealing surface of the fitting when the male threads are mated with the female threads.

9. The thermocouple structure of claim 6, in which the inner electrical coupling has a first insulator mounted inside the first member between the first member and the second element of the thermocouple to control the position of the end of the second element and a second insulator mounted inside the second member between the second member and the second conductor of the cable to control the position of the end of the second conductor.

10. A thermocouple structure comprising:
a thermocouple having first and second metallic elements that are electrically isolated except for a single thermocouple junction;
a lead cable having first and second electrically isolated conductors;
a connector having an outer body portion that electrically connects the first element of the thermocouple to the first conductor of the cable, the outer body portion comprising members that are separable by relative movement along a given axis; and
means inside the outer body portion for forming between the second element of the thermocouple and the second conductor of the cable a separable internal electrical coupling with limited freedom of movement relative to the body portion along the given axis, the body portion and the internal coupling being electrically isolated from each other, the internal electrical coupling comprising a first electrically conductive spring keeper electrically connected to the end of the second element, a second electrically conductive spring keeper secured and electrically connected to the end of the inner conductor, and a coil spring retained by the spring keepers in approximate axial alignment with the second element and the second conductor, the coil spring having an electrically conductive outer surface in contact with the spring keeper.

11. The thermcouple structure of claim 10, in which the spring keepers have a force fit connection to the coil spring.

12. The thermocouple structure of claim 10, in which the spring keepers have an electrically conductive bonded connection to the coil spring.

13. The thermocouple structure of claim 10, in which the first spring keeper has an indentation that matches the end of the second element, the indentation of the second spring keeper being maintained in engagement with the end of the second element by the restoring force of the coil spring.

References Cited

UNITED STATES PATENTS

| | | | |
|---|---|---|---|
| 2,858,350 | 10/1958 | Fritts et al. | 136—228 |
| 2,137,280 | 11/1938 | Hartmann | 136—228 X |
| 2,961,474 | 11/1960 | Fritts | 136—228 |
| 2,963,532 | 12/1960 | Bell | 136—235 |
| 2,992,288 | 7/1961 | Betz | 136—228 |
| 3,055,961 | 9/1962 | Robertson et al. | 136—235 |
| 3,147,457 | 9/1964 | Gill et al. | |
| 3,556,864 | 1/1971 | Wagner | 136—228 |

FOREIGN PATENTS

| | | | |
|---|---|---|---|
| 132,132 | 9/1919 | Great Britain | 136—228 |

CARL D. QUARFORTH, Primary Examiner

E. E. LEHMANN, Assistant Examiner

U.S. Cl. X.R.

136—230, 235